United States Patent Office 2,780,777
Patented Feb. 5, 1957

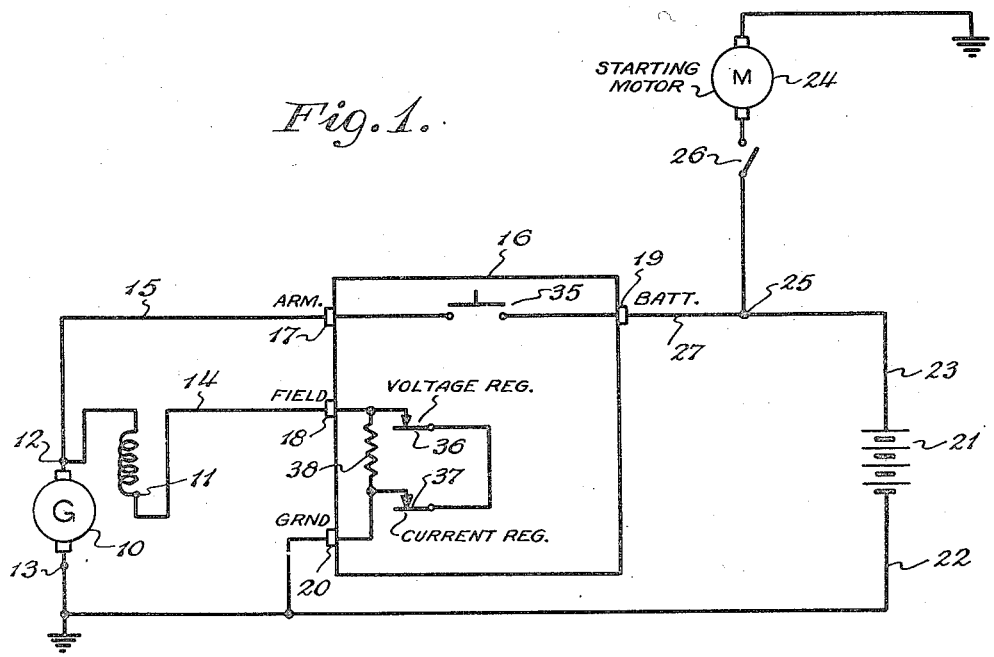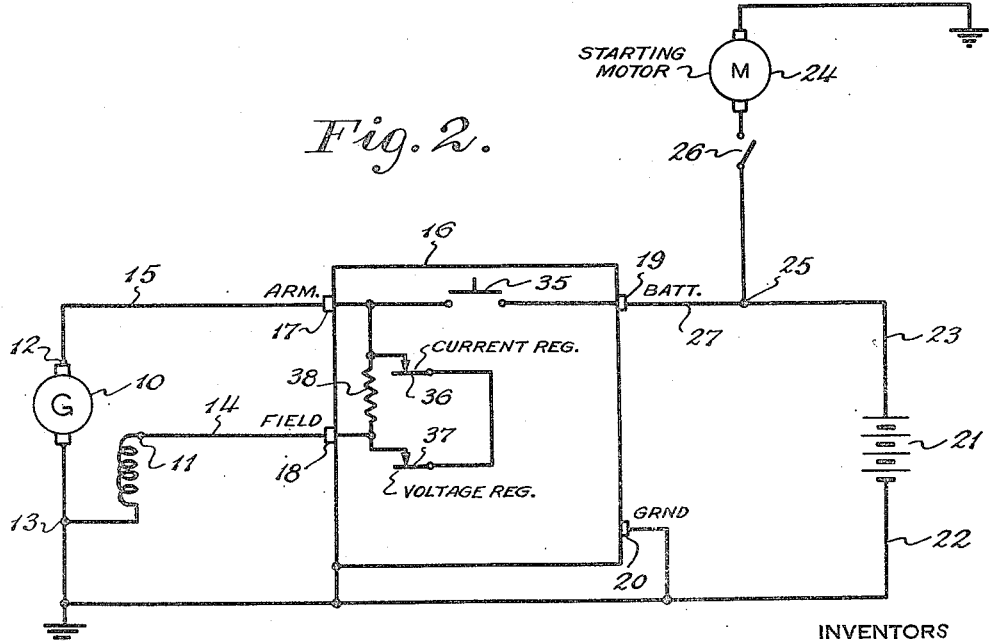

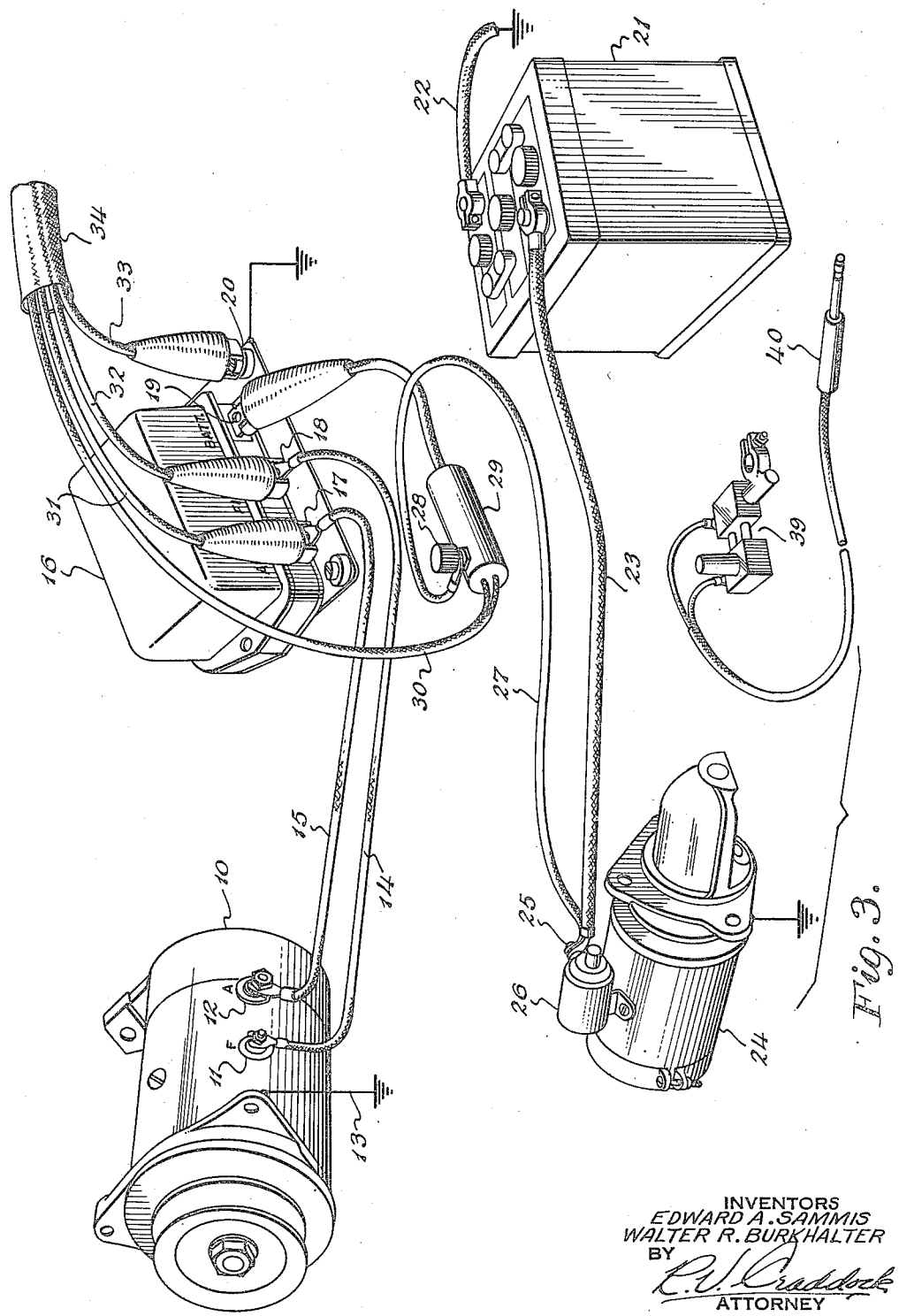

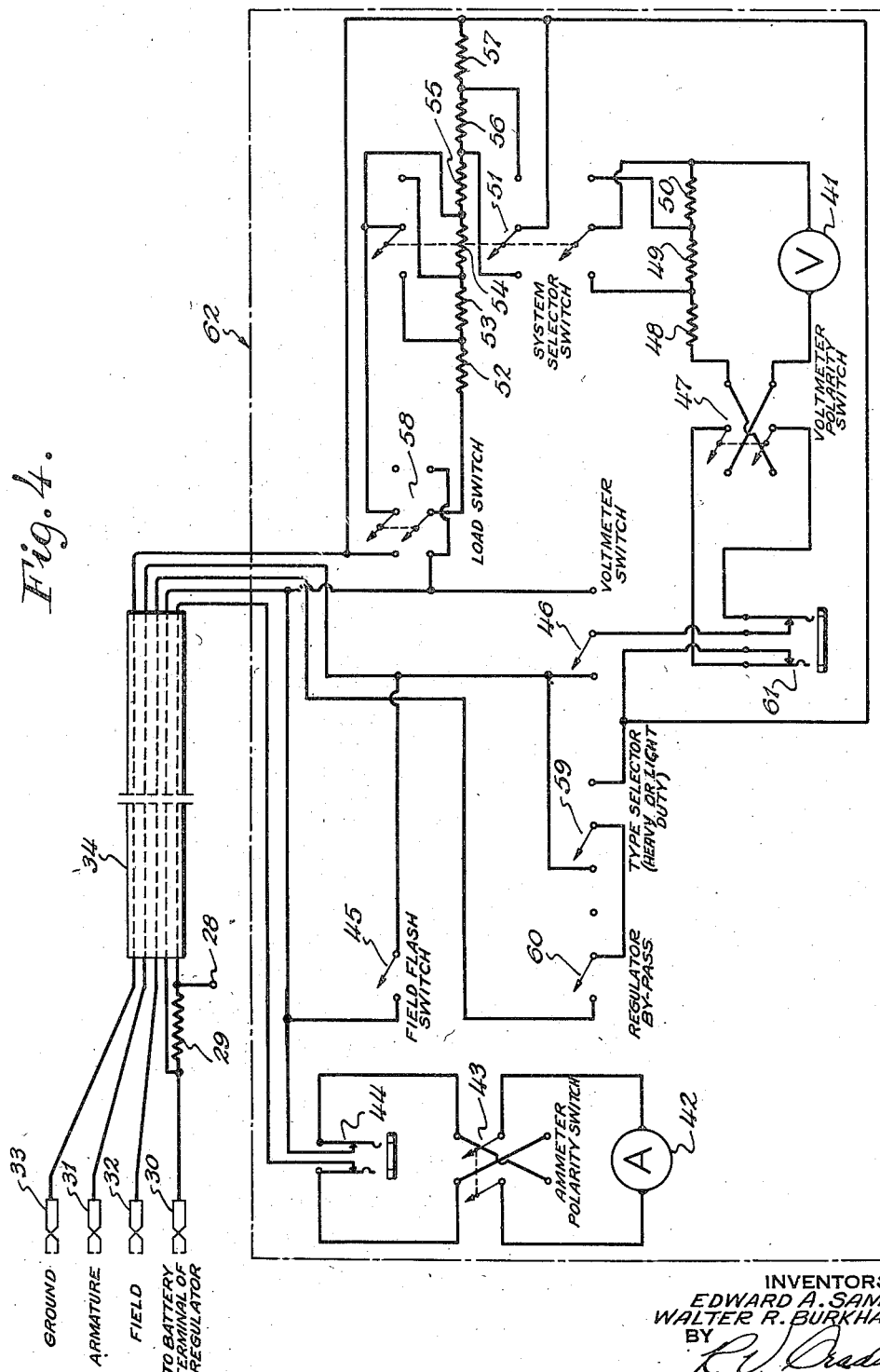

2,780,777

TEST APPARATUS FOR ELECTRICAL SYSTEMS

Edward A. Sammis, Roslyn Heights, and Walter R. Burkhalter, Great Neck, N. Y., assignors to Sperry Rand Corporation, a corporation of Delaware Application May 11, 1953, Serial No. 353,993

5 Claims. (Cl. 324—73)

The present invention relates to an apparatus for testing motor vehicle electrical systems. In particular, the present invention is intended to be used for testing that portion of a motor vehicle electrical system comprising the battery, the starter motor, the generator and the regulator. The object of the present invention is to afford accurate and expeditious testing of the operation of the aforementioned components in the motor vehicle electrical system without the repetitious changing of connections to the test apparatus as was necessary with many of the prior art devices.

In its most rudimentary concept, the present invention may be said to be a combination of voltage and current measuring instruments arranged and interconnected with multiple switch means and other electrical components of appropriate values so that the generator, battery, starter motor and regulator functioning may be thoroughly checked with but a few simple connections of the test apparatus to the electrical system as it is usually found in a motor vehicle.

Devices designed to perform the same test functions heretofore, necessitated the removal of many of the connections between elements of the motor vehicle electrical system. It was also necessary in many cases to change the connections of clip leads from the test instrument to the electrical components in the motor vehicle system for each test performed. The present invention requires that only one connection of the motor vehicle electrical system be removed and the leads to the test apparatus may be clipped to terminals without disturbing the electrical system. With this arrangement, all the major tests of the above-named components in most motor vehicle electrical systems may be tested for operation and adjustment without further changing the clip leads to the test apparatus or disturbing interconnections within the motor vehicle electrical system. A better understanding of the invention will be had from the explanation of the operation of the components comprising test apparatus as illustrated in the drawings, in which:

Fig. 1 is a schematic diagram of an automotive electrical system having a generator of the externally grounded field type;

Fig. 2 is a schematic diagram of an automotive electrical system having a generator of the internally grounded field type;

Fig. 3 is a perspective drawing of the major components of an automotive electrical system and an auxiliary accessory which may be employed in accordance with the present invention; and Fig. 4 is a schematic diagram illustrating a preferred embodiment of the present invention.

Normally, a motor vehicle electrical system is comprised principally of the components shown in Figs. 1 and 2 together with the lighting and ignition systems. The lighting system may be considered to include electrical accessories such as electrical windshield wipers, heater fans, defroster fans, cigarette lighters, etc. Since both the ignition system and the lighting system are dependent upon the battery and the generator for their source of electrical energy, the functioning of the components shown in Figs. 1 and 2 is relatively more important inasmuch as they are the basic source of power in the overall motor vehicle electrical system.

Numerical designation of comparable components in the electrical systems and interconnections shown in Figs. 1 and 2 are the same. In each illustration a generator 10 is shown as having three terminals, namely, a field terminal 11, an armature terminal 12, and a ground terminal 13, which grounds the generator to the motor vehicle frame. The generator 10 is normally connected by two leads 14 and 15 to a field terminal 18 and an armature terminal 17, respectively, which are part of the electrical regulator 16.

The regulator 16 usually performs three functions in the motor vehicle system, namely, connecting the generator to the battery when the generator voltage exceeds that of the battery by a predetermined value, regulating the voltage output of the generator, and regulating the current output of the generator. A fuller explanation of the detailed operation of typical regulators in common use will appear hereinafter.

A third major component in a motor vehicle electrical system is a battery 21 which is shown in Figs. 1 and 2 as being connected from one of its terminals through a cable 22 to ground, which is, of course, the frame of the motor vehicle. The other terminal of the battery 21 is connected through a cable 23 to a terminal 25 of a starter switch 26 which controls the flow of current from the battery to the motor vehicle starter motor 24.

To appreciate the objects and features of the present invention, an understanding should be had of the operation of typical motor vehicle electrical systems such as are illustrated in Figs. 1 and 2. These two systems are the most common in use and are identical except for the type of regulator and the type of generator field winding. In Fig. 1 a regulator and generator of the externally grounded field type is shown. In Fig. 2 a regulator and generator of the internally grounded field type is shown. The difference in operation between these two generators and their associated regulators will be evident from the description of the operation of each of two typical systems which follows.

In Fig. 1 the generator 10 is shown as being connected on one side to ground 13 and on the other side to both the armature terminal 17 of the regulator 16 and the field of the generator. The field terminal 11 of the generator 10 is connected by means of a lead 14 to the field terminal 18 of the regulator.

Within the regulator are shown three units, namely, the cut-out device 35, the voltage regulator 36 and the current regulator 37. The cut-out device 35 is usually a relay-operated switch which disconnects the battery 21 from the generator 10 when the generator output falls below a predetermined electrical value in order to prevent discharge of the battery 21 through the generator armature. The voltage regulator 36 is usually a relay-operated switch, the relay having a voltage sensitive winding of high resistance designed so that when a predetermined value of voltage output is reached by the generator 10, the switch contact points are caused to open. The voltage regulator contact points are in turn connected to a current regulator 37 which operates in a similar manner but has a winding of comparatively low resistance and responds to excessive current flow.

The voltage regulator 36 and current regulator 37 are connected in series with each other and in parallel with a resistance 38. One side of this parallel circuit is connected to the field circuit of the regulator at the field terminal 18 of the regulator 16 and to the ground terminal 20 of the regulator 16 on the other side. Thus, the generator 10 supplies current to its own field winding from its armature output. When both the voltage and current regulator contacts are closed, the field current flow, and thus the output of the generator, will tend to increase directly as the rotary speed of the generator armature.

However, when a predetermined maximum value of either voltage or current is exceeded, the contacts of either the voltage regulator 36 or the current regulator 37 will open and effectively place the field resistance 38 in series with the field winding of the generator. This reduces the amount of current flow in the field windings of the generator with the result that the output of the generator is diminished. The voltage and current regulators, as well as the cut-out relay, are usually a spring-loaded type which are adjustable so as to be operative at a considerable range of determinable values of electrical energy.

The battery terminal 19 of the regulator 16, as shown in Figs. 1 and 2, is connected to the battery 21 at its positive terminal through leads 27 and 23. This arrangement is illustrative of the normal operating state of the system before the test apparatus is connected to the system. Depending upon the polarity of the system in the motor vehicle system, however, the battery terminal 19 of the regulator 16 may be connected to the negative terminal of the battery 21. The other side of the battery 21 is, of course, connected to ground, as shown in Figs. 1 and 2.

The operation of the electrical system shown in Fig. 2 is substantially the same as that of the electrical system shown in Fig. 1, with the exception of the generator field and the current and voltage regulators. Fig. 2 shows the so-called internally grounded field type of generator and the regulator employed with it. In this arrangement, the field winding of the generator 10 is connected directly on one side to ground through a terminal 13. On the other side it is connected to the field terminal 18 of the regulator 16. The field terminal 18 of the regulator is connected internally within the regulator 16 to a resistance 38 so that field current may be drawn from the armature of the generator through the resistance 38 and the field coil to ground 13.

In parallel with this resistance 38 are both the current and voltage regulators, 36 and 37, arranged in a manner similar to that of the previously described system of Fig. 1. Thus, when both the current and voltage regulator contacts are closed, the resistance 38 is bypassed, increasing the amount of current flow in the field windings of the generator and the generator output increases proportionally. When, however, either the current or voltage output of the generator exceeds a predetermined maximum value, one of these two sets of contacts will open with the result that a reduced amount of field current flows due to the fact that resistor 38 is in series in the field circuit of the generator 10, and no longer bypassed.

As is apparent from the foregoing description, all the major component parts of the motor vehicle electrical system may be tested by appropriate connection to a voltage and current measuring means for each test to be performed. The present invention combines a voltmeter and an ammeter with appropriate switching arrangements and interconnections, to afford comprehensive testing of all the aforementioned major components of a motor vehicle electrical system by making four simple connections to readily accessible terminals in the motor vehicle system, operating switches on the test apparatus, and observing meter reading indications of the test apparatus.

When employing the test apparatus in accordance with the present invention to check the operation of a motor vehicle electrical system, four leads are connected to the system undergoing test. These leads may be terminated with clip type connectors to facilitate easy and quick electrical contact with appropriate terminals of the vehicle's electrical system.

Three of the four connections from the test apparatus to the motor vehicle electrical system under test may be made by simply clipping on three of the test apparatus leads 31, 32 and 33 to terminals 17, 18 and 20, respectively, of the electrical system's regulator as is illustrated in Fig. 3.

It will be recalled, from prior descriptions and illustrations of Figs. 1 and 2, that when the vehicle is in its normal operating state, battery 21 is connected directly to the regulator 16 through the two connections 23 and 27. In Fig. 3, however, lead 27 is shown as having been disconnected from the regulator 16 and reconnected to terminal 28 of a shunt 29 provided in the test apparatus lead 30, the clip terminal of which is then connected to the regulator 16 at terminal 19. This is the fourth and last connection made from the test apparatus to the electrical system of the vehicle.

All four of these leads, 30, 31, 32 and 33, may be enclosed in a common sheath 34 such as is illustrated in Fig. 3, because once having been so connected it is not necessary to disturb or reconnect any of the leads to another part of the vehicle to complete all the major tests necessary to verify the performance of an automotive electrical system. The reason for the interposition of shunt 29 between lead 27 and regulator 16 will appear more fully hereinafter in connection with the explanation of the operation of a typical test apparatus embodiment of the invention which follows.

The test apparatus leads 30, 31, 32 and 33 illustrated in Fig. 4 are the same leads shown in Fig. 3 and should be envisioned as being connected to an automotive electrical system's terminals which have been previously described and illustrated in connection with Figs. 1, 2 and 3.

Except for the test apparatus leads, the embodiment of the present invention as illustrated in Fig. 4 may be completely enclosed in a case, 62. Such an arrangement affords adequate protection for the instruments and components of the apparatus and allows the indicator dials and switches to be conveniently placed for ease and facility of observation and operation.

The test apparatus of the invention disclosed in the embodiment of Fig. 4 includes two measuring instruments, namely, a voltmeter 41 and an ammeter 42. The ammeter 42 is connected through a double-pole, double-throw switch 43 to afford reversal of its input terminals so that current flow in either direction may be indicated. The input side of the double-pole, double-throw switch 43 is connected to an ammeter shunt 29 of the battery terminal connection 30 from the test apparatus to the regulator 16 of the system undergoing test. By this means, the amount of current flowing either from the generator 10 to the battery 21, or from the battery 21 to the generator 10 may be read from the indicator dial of the ammeter 42.

The voltmeter 41 is connected in series with a number of resistances 48, 49 and 50, which afford use of the same voltage measuring instrument 41 for either a six, twelve or twenty-four volt system, depending upon the voltage rating of the motor vehicle electrical system undergoing test. The input to the voltmeter 41 is also connected to a double-pole, double-throw switch 47 which affords reversal of the polarity of the input to the voltmeter 41 so that electrical systems having either a positive or negative ground may be readily tested. The other side of the double-pole, double-throw switch 47 associated with the voltmeter 41 is connected to a switch 46 which affords connection of the voltmeter 41 to either the armature terminal 17 of the regulator 16 through lead 31, or to the battery terminal 19 of the regulator 16 through lead 30. Thus, by use of switch 46 the voltmeter 41 can be made to indicate the potential of the battery 21 or of the generator 10.

Two single-pole, double-throw switches 59 and 60 have their movable contacts interconnected and stationary contacts so connected to the remainder of the test apparatus that the first of the switches 60 affords bypass of the current and voltage controls 36 and 37 of the electrical regulator 16 of the system, and the second of the switches 59 affords optional grounding of the field through lead 32, or connection back to the armature terminal 17 through lead 31, depending upon whether a grounded field system or ungrounded field system is being tested.

A single-pole, single-throw, momentary-contact switch 45 is interposed in series connection between lead 30 and the armature connection 31 of the test apparatus and upon closing of the switch 45, momentary flashing of the armature circuit of the generator is had for the purposes of test and also to properly magnetize the pole pieces of the generator field windings.

The load switch 58 is a double-pole, double-throw, center-off toggle switch, one side of which is spring-loaded and of the momentary-contact type. When in the momentary-contact position, which is the left-hand position as shown in Fig. 4, this switch completes a circuit from the high potential side to the ground side of the battery through a small fixed resistance. By positioning the system selector switch 51, the load resistance thus connected may consist of one resistance, 52, two resistances, 52 and 53, connected in series, or three resistances, 52, 53 and 54, connected in series. These combinations of resistive values afford test of six, twelve and twenty-four volt systems. By observation of the reading of the voltmeter, an excessive amount of resistance in the battery circuit will be indicated.

The center position of the load switch 58 has no effect upon the motor vehicle system so that normal operation of the battery circuit is had. The remaining right-hand position of the load switch 58 as shown in Fig. 4 places a fixed amount of resistance (such as resistances 52 and 55 for a six volt system) in circuit with the battery connection 30 of the regulator 16 which resistance is used to replace the normal battery load in testing the output of the generator 10 and operation of the regulator 16. In this latter position, the battery lead 27 connected to the ammeter shunt 29 must be disconnected to remove the vehicle's battery 21 from the system.

The function and purpose of the test apparatus of the invention can be better understood from a description of a typical series of steps in a testing procedure.

During the test procedure, it should be borne in mind that the ammeter reversing switch 43 and voltmeter reversing switch 47 are to be properly positioned whenever it becomes necessary to make either the ammeter 42 or voltmeter 41 read up scale. The ammeter reversing switch 43 is utilized to make the ammeter 42 read up scale depending upon whether the system is drawing current from the battery, or the generator is charging the battery. The voltmeter reversing switch 47 changes polarity of the input to the voltmeter to accommodate systems of either negative or positive ground and also to check voltage drops due to current flow in either of two possible directions.

Initially the four clip leads 30, 31, 32 and 33 from the test apparatus of the invention are connected to the correct respective terminals 17, 18, 19 and 20 of the electrical system's regulator as has been described hereinbefore and as is illustrated in Fig. 3.

The second preliminary step is to position the system selector switch 51 in the right or left position depending upon whether the vehicle has a six volt or twelve volt or center position for a twenty-four volt electrical system. As will be seen from Fig. 4, the system selector switch 51 is a three bank multiple switch. The three functions of the apparatus which are affected by the operation of the system selector switch are:

(1) Connection of suitable values of voltmeter multiple resistances 48, 49 and 50 so as to accommodate the automotive systems normally encountered, i. e. (six, twelve or twenty-four volt systems.)

(2) Connection of appropriate values of the fixed load resistances such as 52 and 55 which are used as an artificial load to replace the battery in the voltage regulator check so as to accommodate either the six, twelve, or twenty-four volt system.

(3) Connection of appropriate values of the calibrated resistances 52, 53, 54 and which are employed in a battery circuit resistance test so as to accommodate either a six, twelve, or twenty-four volt system.

The third preliminary step is to position the generator selector switch 59. The left position of the generator selector switch 59, as illustrated in Fig. 4, will connect the regulator bypass switch 60 to the armature for testing an internally grounded generator field winding system. The generator selector switch 59 thus makes possible the changing of the point of connection of the regulator bypass switch 60 to accommodate both the so-called "heavy duty" and "light duty" connected generators and regulators, which nomenclature is synonymous with internally grounded field and externally grounded field types.

Voltage readings of either the generator 10 or the battery 21 may be selected by positioning the voltmeter switch 46. This switch affords changing one of the voltmeter input leads from the battery connection 30 of the regulator 16 to the armature connection 31 of the regulator 16. This makes possible four principal types of readings.

(1) Measuring the voltage drop across the closed contact points of cut-out relay 35.

(2) Observing the build-up of the generator voltage and to ascertain the potential at which the contact points of cut-out relay 35 close.

(3) Checking the voltage maximum as measured from the armature terminal 17 of the regulator 16.

(4) Checking the voltage at the battery terminal 19 of the regulator 16.

This latter method of checking adjustment of the voltage regulator is preferred by some manufacturers of such regulators.

For the purposes of the initial readings to be made with the test apparatus according to the invention, the voltmeter switch 46, which is a single-pole, double-throw, toggle type, should be positioned to read the battery voltage, which is the right-hand position in the apparatus schematic diagram of Fig. 4. The condition and operation of the motor vehicle electrical system may now be observed in a step-by-step method of checking. For purposes of illustration, a typical six volt automotive system will be assumed to be undergoing test. The first series of tests are made without the engine running.

The field flash switch 45 which is a single-pole single-throw spring-loaded type, is momentarily closed (less than five seconds) and the reading of the ammeter 42 observed. Between 16 and 25 amperes of current, for instance, will be indicated for a normal system in one well-known make of vehicle. A lower reading indicates a high resistance in the generator circuit, while a short circuit in the generator circuit will cause a very high reading. The momentary connection of the battery to the generator through field flash switch 45 causes sufficient current flow to properly polarize the pole pieces of the generator, in addition to testing the generator circuit resistance.

Next the load switch 58, which is a single-pole, double-throw, spring-loaded type, is momentarily closed (less than five seconds) in the left-hand position and the reading of the voltmeter 41 observed. A reading of 5.0 to 5.6 volts is the normal voltage drop across the calibrated load resistance 52 for a six volt system. A lower reading of voltmeter 41 indicates a high resistance in the battery circuit.

The engine is cranked in the next test with the ignition turned off. If less than 4.7 volts is observed on the indicator dial of the voltmeter 41, the battery-starter circuit is not functioning normally and trouble such as a weak battery cell, high resistance, etc. is indicated.

The engine of the vehicle may now be started and warmed up for a period of time sufficient to insure normal operating conditions. The vehicle manufacturer's recommendations are usually followed in this regard. The voltmeter switch 46, a single-pole, double-throw, toggle type, is changed to the generator position, which is the left-hand position in Fig. 4.

With the engine of the vehicle running at a speed comparable to 30–35 M. P. H. in high gear, the lights, heater, radio and other electrical accessories are turned on to load the generator. The regulator by-pass switch 60, which is double-throw and spring-loaded, is then closed for a maximum of five seconds. During this period the generator current output as indicated on the ammeter should exceed its rated output by approximately 50%. The lights, and other accessories may be turned off after completion of this test.

The engine is then idled and the speed gradually increased so that the generator output voltage at which the cut-out relay points close may be read on the voltmeter 41. This reading should be in the range of 6.0–6.7 volts.

Next, the engine is run at a speed corresponding to the engine speed at 30–35 M. P. H. in high gear. A current of less than 15 amperes is necessary to test the voltage at which the voltage regulator operates. If this value of amperage cannot be attained readily, the resistor load of the test apparatus may be used to reduce current. The battery lead 27 should be removed from the ammeter shunt 29 after loading the generator by changing the load switch 58 to its right-hand position. The observed voltage reading for this test should indicate operation of the voltage regulator at a value of generator potential output low enough to prevent burning out of lamps, etc. in the vehicle system, and high enough to insure sufficient charge of the battery for normal operating conditions. The regulator manufacturer's specification should be consulted in this regard.

Continuing to run the engine at the same speed, the lights, heater, radio and other electrical accessories are turned on again to load the generator to test operation of the current regulator. The voltage reading should be appreciably less than that of the preceding test (of the order of 0.5 volt) and the ammeter reading should not exceed the rated output of the generator.

It is to be noted that throughout all the tests performed as described hereinbefore, none of the four connecting leads 30, 31, 32 and 33 need have been changed, or reconnected in any way. Nor has any portion of the motor vehicle electrical system been disturbed or disconnected after the initial connections have been made to the test apparatus. It is one of the main advantages of the present invention that a typical automotive electrical system may be thoroughly tested by simply connecting the four clip leads to four terminals in the system as described herein and observing meter indications afforded by the test apparatus in accordance with the invention.

This and other advantages of the present invention simplify the checking of a motor vehicle electrical system, eliminating the major source of error due to constant connection and reconnection of meter leads as was the necessary practice in the prior art. Coincident with this advantage is the further attractive feature that the complete testing of the automotive electrical system may be performed much more rapidly than heretofore, as well as more accurately. It is evident, of course, that the straightforward, simple operation of the test apparatus in accordance with the present invention lends itself readily to use by comparatively unskilled operators.

Appropriate portions of the dial faces of both the ammeter and voltmeter may be inscribed to indicate the limits of normal readings for the various tests performed in accordance with the procedure outlined hereinbefore.

If desirable, the portions of the dials between the extremes of normal readings may be further emphasized by contrasting color segments to afford speedy indications of normal and abnormal meter readings for any given test.

Additionally, test apparatus in the embodiment of the invention as illustrated by Fig. 4 is also equipped with a jack 44 to receive a high current ammeter shunt connection. The high current shunt 39 is illustrated in Fig. 3 and is intended to be connected in series between the high potential terminal of the battery 21 and the starter cable 23. The shunt 39 is constructed to accommodate battery cable terminals and comprises a relatively very small but accurately calibrated resistance. Leads are tapped off either side of the calibrated resistance and connected to a plug 40 which may be inserted in the jack 44 of the test apparatus to effect connection with the ammeter 42. By this means the amount of voltage drop across the calibrated small resistance may be read on an appropriate multiplying scale of the ammeter 42 in terms of current drawn by the starter motor from the battery when the engine of the motor vehicle is being cranked.

The test apparatus may also be equipped with an auxiliary voltage jack 61 as shown in Fig. 4 to permit the connection of leads to the voltmeter 41 without removing or changing any other connections. In this manner the voltmeter 41 may be used for trouble-shooting in an electrical system by the usual method of checking for excessive voltage drops across each component within the system.

For instance, it may be assumed that normal circuit resistance in typical six volt automotive electrical systems will cause a voltage drop of not more than approximately 0.2 volt between units of the charging system with 20 amperes flowing through the circuit. To obtain these voltage readings, extra voltage leads are plugged into the auxiliary voltmeter jack 61. The other ends of these leads are successively connected across each unit of the automotive electrical system where the voltage reading is to be made.

Utilizing this facility, the test apparatus may be employed to serve the further useful purpose of systematically tracing the source of excessively high resistance, in a manner well-known in automotive electrical testing.

The auxiliary voltage leads are connected to the test apparatus through a shorting jack 61 which is designed so that the insertion of the plug disconnects the voltmeter from all other input. Thus, the process of trouble-shooting may be carried out by checking for excessive voltage drops without in any way changing or disturbing other connections made from the test apparatus to the automotive electrical system. This additional feature allows interruption of the usual series of tests to check a particular malfunction, and upon location of the source of trouble, the tests may immediately be resumed where they were left off by simply removing the auxiliary voltage plug from the test apparatus.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An apparatus for testing motor vehicle electrical systems of the type including a battery, a generator connected through its field and armature to a regulator having external armature, field, battery, and ground terminals, the regulator being comprised of a cut-out device connected serially between the regulator armature terminal and the regulator battery terminal, and means connected internally to the regulator field terminal so as to govern the voltage and current output of said generator by control of the field current flow in the generator, said test apparatus comprising leads with detachable connections on the ends thereof adapted to electrically connect said test apparatus to each of said regulator terminals and said battery, current measuring means serially connected between said battery lead and said regulator battery terminal lead, a voltmeter, means arranged to selectively connect said voltmeter to said regulator armature terminal lead or said battery lead, a resistance, means adapted to optively connect said resistance across said battery and ground leads, means adapted to optively connect said regulator armature terminal lead to said regulator field terminal lead whereby to bypass said generator governing controls, and means adapted to optively connect said regulator armature lead to said regulator battery terminal lead whereby to bypass said regulator cut-out device.

2. An apparatus according to claim 1, including a plurality of resistances disposed to be selectively connected to one side of said battery lead, a plurality of resistances disposed to be selectively connected across said voltmeter, ganged multiple switch means connected to said voltmeter and to ground for simultaneously connecting said respective selected resistances to said battery lead and to said voltmeter in accordance with the voltage rating of the motor vehicle system being tested.

3. An apparatus according to claim 1, including a resistance connected in parallel with said current measuring means whereby high current values may be indicated on a multiplier scale of said current measuring means without damage to said instrument.

4. An apparatus according to claim 1, including switch means comprising a contact connected to the regulator armature lead, a contact connected to ground, and a movable contact connected to said regulator by-pass means and adapted to selectively engage either of said two last-named contacts, whereby said apparatus may be employed to test systems having either an internally or externally grounded generator field winding.

5. An apparatus according to claim 1, including a calibrated resistance connected in the battery-starter circuit of said electrical system, a connection from the battery side of said calibrated resistance to one terminal of said current measuring means, a connection from the starter side of said calibrated resistance to the other terminal of said current measuring means, whereby a measure of the starter current drawn by said system is indicated on a scale of said instrument multiplied in correlation to said calibrated resistance.

References Cited in the file of this patent

UNITED STATES PATENTS

| | | |
|---|---|---|
| 2,254,846 | Heyer | Sept. 2, 1941 |
| 2,352,499 | Sears | June 27, 1944 |
| 2,623,925 | Schaefer | Dec. 30, 1952 |